United States Patent [19]
Genda et al.

[11] Patent Number: 5,025,413
[45] Date of Patent: Jun. 18, 1991

[54] DATA PROCESSING APPARATUS INCLUDING A DELETE FUNCTION

[75] Inventors: Kohei Genda; Kazuaki Murai, both of Fussa, Japan

[73] Assignee: Casio Computer Co., Ltd., Tokyo, Japan

[21] Appl. No.: 319,142

[22] Filed: Mar. 3, 1989

[30] Foreign Application Priority Data

Mar. 8, 1988 [JP] Japan ............................. 63-29853[U]

[51] Int. Cl.$^5$ .............................................. G06F 3/153
[52] U.S. Cl. ................................ 364/900; 364/927.61; 364/521
[58] Field of Search ...................... 364/900, 927.61, 52; 340/709, 710, 754

[56] References Cited

U.S. PATENT DOCUMENTS

| | | | |
|---|---|---|---|
| 4,412,294 | 10/1983 | Watts et al. | 364/900 X |
| 4,706,074 | 11/1987 | Muhich et al. | 364/900 X |
| 4,806,916 | 2/1989 | Raskin et al. | 364/900 X |
| 4,890,257 | 12/1989 | Anthias et al. | 364/900 |

*Primary Examiner*—Thomas M. Heckler
*Attorney, Agent, or Firm*—Frishauf, Holtz, Goodman & Woodward

[57] ABSTRACT

In a data processing apparatus including a single delete key, in accordance with a cursor position when the delete key is operated, a selection is made as to whether to execute a so-called "delete function" where the data indicated by the cursor is deleted, or a so-called "back delete function" where the data just before the cursor-indicated data is deleted. When the cursor indicates the data subsequent to the end data, the back delete function is executed. In other cases, the delete function is executed.

6 Claims, 3 Drawing Sheets

DATA PROCESSING APPARATUS INCLUDING A DELETE FUNCTION

BACKGROUND OF THE INVENTION

1. Field of the Invention

The present invention relates to a data processing apparatus including a delete function for deleting data indicated by a cursor, and also a back delete function for deleting another data positioned just before the cursor-indicated data on a display.

2 Description of the Related Art

In data processing apparatuses, e.g., a wordprocessor and a personal computer, various kinds of key operations are employed so as to efficiently enter data therein even if the key operations achieve similar functions.

For deleting the entered data, there are, for instance, both a delete function to delete the data which is being indicated by the cursor, and also a back delete function to delete another data which is positioned just before the cursor-indicated data.

In accordance with the conventional delete function, there is an advantage that an operator can surely recognize the data to be deleted since this data is positioned in a specific position indicated by a cursor.

However, this delete function has a drawback due to the fact that the data deleting operation is frequently required just after the data entry while inputting the data. In this case, since the delete key must be operated by returning the cursor to the data position preceding the present data position according to the above-described delete function, the data entry operation is slowed down.

To the contrary, the above-described known delete function can complement the above-explained drawback of the delete function. That is, in case the data just entered during the data input operation is to be deleted, this data can be readily deleted by operating the back delete key only one time, which does not cause the efficiency of the data input operation to be lowered.

This known back delete function has, however, a different drawback. Namely, since the data positioned just before the data indicated by the cursor is deleted according to the back delete function, an operator can hardly recognize the data to be deleted. In other words, the data to be deleted by this back delete function is not indicated by the cursor.

To solve these drawbacks of the conventional data processing apparatuses, another type of data processing apparatus equipped with both delete and back delete functions has been proposed. In such a data processing apparatus, two keys for executing such a similar function, i.e., the delete key and back delete key, are required. This has the disadvantage that an operator may mistakenly mainpulate the incorrect function key.

SUMMARY OF THE INVENTION

The present invention has been made in an attempt to solve the above-described problems of the conventional data processing apparatus, and has an object to provide a data processing apparatus equipped with both a delete function and a back delete function, whereby no error key operation is made by an operator and the operabilities of the data processing apparatus can be improved.

To achieve the above-described object, a data processing apparatus according to the present invention comprises:

data input means for inputting data;

memory means having a plurality of storage areas for storing said data entered by said data input means;

display means having a plurality of display areas for storing said data stored in said memory means;

cursor means for designating said storage areas of said memory means and for displaying a cursor on said display area of said display means in correspondence to said storage area designated;

cursor detecting means for detecting said storage area designated by said cursor;

delete-command input means for inputting a delete-command; and, deleting means for deleting one of the data stored in said storage area designated by said cursor means and the data stored in said storage area before said storing area designated by said cursor means in response to a detecting result obtained by said cursor detecting means, when the delete-command is input from said delete-command input means.

In the data processing apparatus according to the present invention, including the above-described arrangements, either the delete function or the back delete function can be performed by operating a single key in accordance with the operation conditions. As a consequence, the key operabilities while deleting the unwanted data on the display can be improved, and the possibilities of an erroneous key operation by the operator can be reduced.

BRIEF DESCRIPTION OF THE DRAWINGS

The above and other useful and novel features of the present invention will become more readily apparent from the following description of the accompanying drawings, in which.

DETAILED DESCRIPTION

Circuit Arrangement of Pocket Computer

Figure 1:
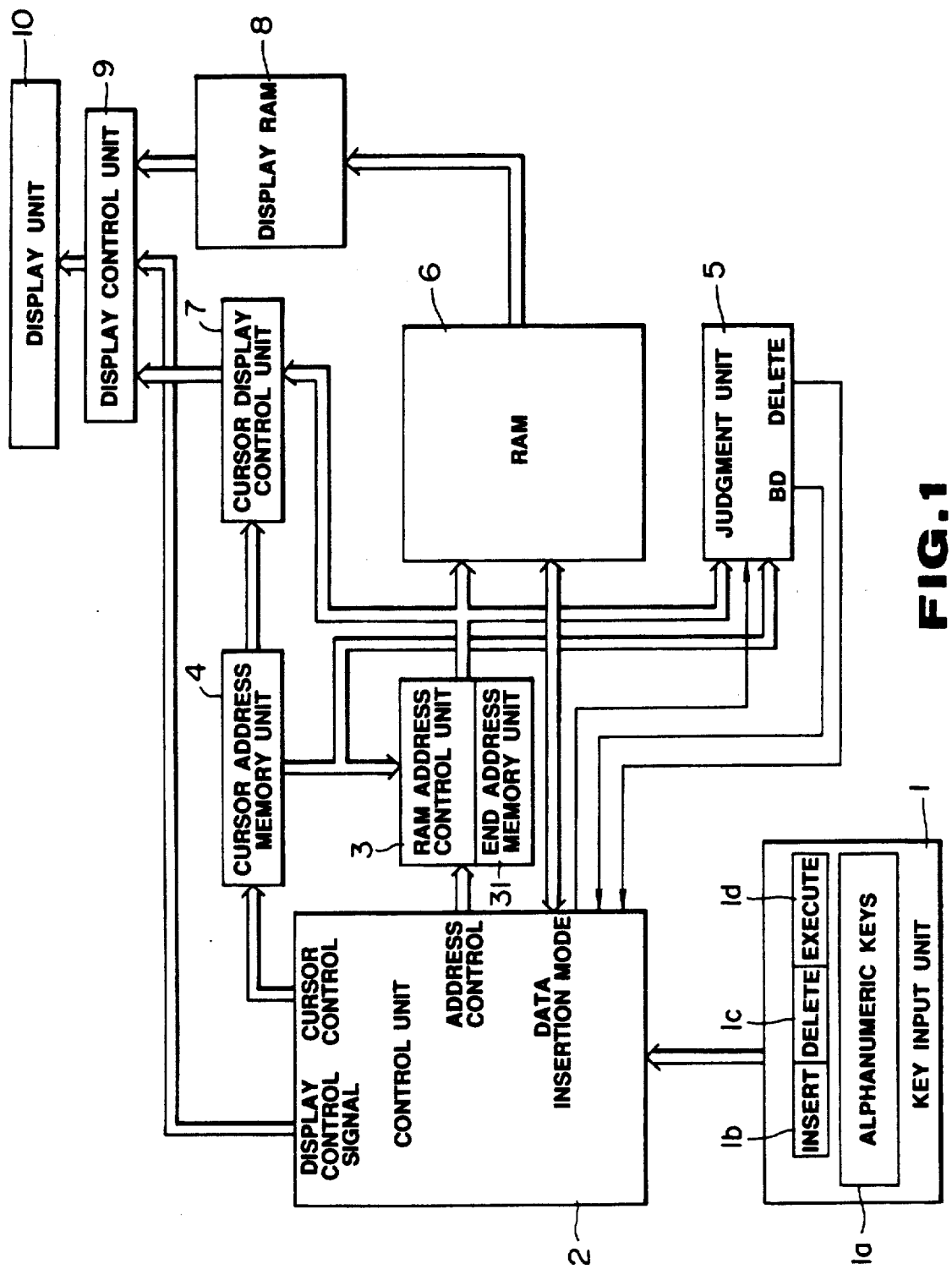
FIG. 1 is a schematic block diagram of an entire circuit of a pocket computer according to one preferred embodiment of the invention.

Referring now to FIG. 1, a circuit arrangement of a pocket computer according to one preferred embodiment of the invention will be described.

In the pocket computer shown in FIG. 1, a key input unit 1 is employed. The key input unit 1 includes alphanumeric keys 1a for entering either characters or numeric data, an insert key 1b for designating an insertion mode, and a delete key 1c for designating data to be deleted, and an execute key 1d for designating execution of a data processing operation. Key input data derived from the key input unit 1 are supplied to a control unit 2.

The control unit 2 includes a read only memory (ROM, not shown) into which a control program has been previously stored, and which outputs various control signals for controlling the key input unit 1 and various circuits (to be described later).

The control unit 2 supplies an address control signal to a RAM (random access memory) address control unit 3, a cursor control signal to a cursor address memory unit 4, and an insertion mode signal to a judgement unit 5.

The function of the RAM address control unit 3 is to address-control RAM 6. This RAM address control unit 3 includes an end address memory unit 31 for storing an end (final) address of the data temporarily stored in RAM 6. The output signal of RAM address control unit 3 is supplied to not only RAM 6, but also to the judgement unit 5 and to a cursor display control unit 7. The function of the cursor address memory unit 4 is to store RAM addresses corresponding to a cursor position on a display unit 10 (to be discussed later). The output signal from the cursor address memory unit 4 is furnished to the cursor display control unit 7, RAM address control unit 3 and judgement unit 5. The function of the judgement unit 5 is to judge whether the delete function or back delete function is to be executed. In accordance with the preferred embodiment, a back delete (BD) signal is supplied to the control unit 2 under the condition that the cursor position is located at the position subsequent to the data finally entered, or the insertion mode is selected, whereas a delete (DELETE) signal is supplied to the control unit 2 under conditions other than the above condition. In response to the address signal from the RAM address control unit 3, the data write/read operations for the control unit 2 are performed in RAM 6. The display data is output from RAM 6 to a display RAM 8.

In response to a display control signal derived from the above-described control unit 2, the display RAM 8 is under read/write control. The data stored in display RAM 8 is supplied to a display control unit 9.

The above-described cursor display unit 7, on the other hand, produces data representative of a display position of a cursor on a display unit 10 based upon an address value of the display data output from the RAM address control unit 3 and also another address value output from the cursor address memory unit 4, and thereafter supplies the produced data to the display control unit 9. Also, the function of the above-described display unit 9 is to produce a display pattern in response to the display data supplied from the display RAM 8 and also the data supplied from the cursor display control unit 7, and also to supply the display signal to the display unit 10. The display unit 10 comprises, for example, a liquid crystal display (LCD) and is capable of displaying alphanumeric characters or numerical values in 1 line, 12 columns.

Data Deleting Operation

A data deleting operation of the pocket computer according to the preferred embodiment of the invention will described with reference to a flowchart shown in FIG. 2 and various display conditions illustrated in FIGS. 3A to 3E.

First, a display condition shown in FIG. 3A displays that the alphabet data items "A B C" have been previously input via the key input unit 1 into the pocket computer in FIG. 1.

Figure 2:
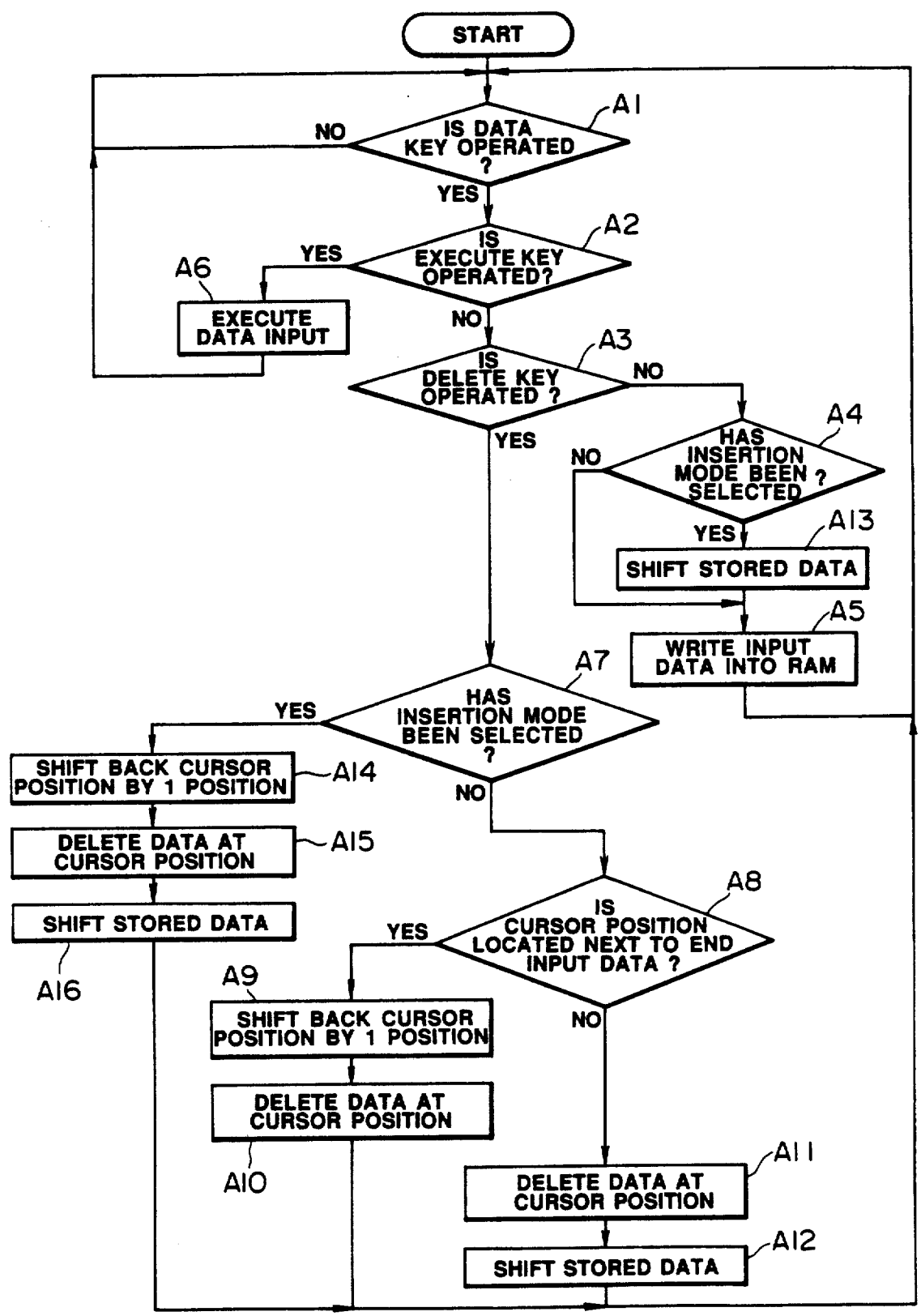
FIG. 2 is a flowchart for explaining a key operation process of the pocket computer shown in FIG. 1; and, FIGS. 3A to 3E illustrate display conditions at the various steps of the data process defined in the flowchart shown in FIG. 2.

Under this condition, when the alphanumeric key of "D" is operated for a data entry, a judgement is made that the key is operated at a step A1 of the flowchart shown in FIG. 2. Then, the data entry process is advanced to a next step A2, where another judgement is made whether or not the input key corresponds to the execute key. In this case, since the judgement is made "NO", the data entry process is advanced to step A3. Then, a judgement is made whether or not a delete key is operated. Also a judgement is made "NO" in this step A3, and accordingly the data entry process is advanced to step A4. In this step A4, a decision is made whether or not the insertion mode is selected. If the insertion mode has not been selected, the data entry process is advanced to step A5. In the step A5, the above-described input data item "D" is written into RAM 6 and the display RAM 8, and also displayed via the display control unit 9 on the display unit 10.

It should be noted that when the input data item "D" is written into the above-described RAM 6, this RAM 6 is addressed by the RAM address control unit 3 in accordance with the address value output from the cursor address memory unit 4. Then, the address value of the cursor address control unit 4 is incremented in response to the cursor control signal derived from the control unit 2. The incremented address value is supplied to the cursor display control unit 7.

As a result, a display condition of the display unit 10 corresponds to a condition shown in FIG. 3B.

In accordance with the above-described data input process, the address value which has been stored into the end address memory unit 31 is similarly incremented.

Under this condition, if the execute key 1d of the key input unit 1 is manipulated, a judgement result of the step A2 is made "YES". Then, the data entry process is advanced to step A6 where the data process is performed.

When, on the other hand, the delete key 1b of the key input unit 1 is operated under the data entry condition as shown in FIG. 3B, a judgement result is made "YES" at the step A3. Then, the data entry process is advanced to step A7. In this step A7, another judgement is made whether or not the present condition corresponds to the insertion mode.

If no insertion mode has been selected, then a judgement result becomes "NO" at the step A7. Thereafter, the data entry process is advanced to step A8. In the step A8, a judgement is made whether or not the cursor position displayed on the display unit 10 is located on a position next to the end of the input data. That is, both the address value stored in the cursor address memory unit 4 and the address value stored in the end address memory unit 31 are output into the judgement unit 5. Then, in the judgement unit 5, a judgement is made whether or not the first-mentioned address value is greater than the second-mentioned address value.

In the display condition shown in FIG. 3B, since the address value stored in the cursor address memory unit 4 is greater than that in the end address memory unit 31, the back delete signal "BD" is output from the judgement unit 5 to the control unit 2. As a consequence, the control unit 2 furnishes such a signal for decrementing the stored address value in the cursor address memory unit 4 to this memory unit 4, whereby the cursor position on the display unit 10 is shifted to a position just before the present cursor position (step A9). Thereafter, the RAM address control unit 3 addresses RAM 6 in accordance with the address value previously stored in the cursor address memory unit 4. The control unit 2 outputs to RAM 6 a signal for deleting the data item "D" stored in the above address value (step A10). The display condition of the display unit 10 according to the above-described data process is shown in FIG. 3A.

Also, in accordance with the above-described data entry process, the address value stored in the end address memory unit 31 is decremented.

Under the display condition shown in FIG. 3C, when the delete key 1c is operated, a judgement is made in the judgement unit 5 that the address value stored in the end address memory unit 31 is greater than that of the cursor address memory unit 4, and thus the judgement unit 5 outputs a delete (DELETE) signal to the control unit 2 (step A8).

Then, the RAM address control unit 3 addresses RAM 6 in response to the address value stored in the cursor address memory unit 4, and delete the data item indicated by "C" which has been stored in RAM 6 in response to the delete signal supplied from the control unit 2 (step A11). Furthermore, the control unit 2 controls both the RAM address control unit 3 and RAM 6 so as to shift data item "D" in the left direction, which has been stored in the address position subsequent to that of the data to be deleted (step A12). Also, in accordance with the above-described data entry process, the address of the end address memory unit 31 is decremented. The display condition of the display unit 10 is shown in FIG. 3D.

Under the display condition shown in FIG. 3D, a description will now be made for the case where the insertion mode is set.

When the delete key 1c is operated under the display condition shown in FIG. 3D, the control unit 2 is set to the insertion mode and outputs an insertion mode signal to the judgement unit 5.

If the alphanumeric key 1a ("F" key) of the key input unit 1 is operated, the data process is executed in the steps A1, A2, A3 and A4, which is similar to the above described process. At the step A4, it is judged that the insertion mode is selected. Then, the control unit 2 controls both the RAM address control unit 3 and RAM 6 so as to shift data in a right direction, which has been stored in an address position OF RAM 6 at the end position from the address value of the cursor address memory unit 4 (step A13). Thereafter, RAM 6 is addressed by the RAM address control unit 3, based upon the address value stored in the cursor address memory unit 4 so that the key input data "F" is written into RAM 6 by the control unit 6 (step S5). As a result, the display condition of the display unit 10 is shown in FIG. 3E.

Under the display condition shown in FIG. 3E, if the delete key 1c has been operated, a judgement is made that the insertion mode has been selected at the step A7 and then the data processing is advanced to a step A14.

In this step A14, the control unit 2 decrements the address value stored into the cursor address memory unit 4. Then, the address value stored in the cursor address memory unit 4 is output to the RAM address memory unit 3. The RAM address memory unit 3 addresses RAM 6 in response to the address value supplied from the cursor address memory unit 4. In addition, the control unit 2 controls both the RAM address memory unit 3 and RAM 6 in order to shift the data "D" in the left direction, which has been stored at the end position with respect to the data to be deleted (step A16). Also the control unit 2 decrements the address value stored in the end address memory unit 31. As a result, the display condition of the display unit 10 is shown in FIG. 3D.

As has been described above in detail, in the pocket computer according to the preferred embodiment of the invention, when the cursor indicates the data subsequent to the last data which has been stored in RAM, and also when the insertion mode is selected, the back delete process is performed in accordance with the operation of the delete key. If an operation other than the above cases is selected, the delete operation can be executed.

What is claimed is:

1. A data processing apparatus comprising:
   data input means for inputting data items to be displayed;
   memory means having a plurality of storage areas for storing data items entered by said data input means;
   display means having a plurality of display areas for displaying said data items stored in said memory means, each of said display areas displaying a data item stored in a storage area of said memory means;
   cursor means including designating means for designating said storage areas of said memory means, and means for displaying a cursor on a display area of said display means which corresponds to said designated storage area;
   cursor detecting means for determining which of said storage areas is designated by said cursor means to thereby determine at which display area of said display means said cursor is displayed;
   delete-command input means for inputting a delete-command for commanding deletion of a data item displayed on said display means and stored in said memory means; and
   deleting means, responsive to the delete-command input from said delete command input means, for deleting one of a data item stored in said storage area designated by said cursor means and a data item stored in said storage area located before said storage area designated by said cursor means, in response to a detecting result obtained by said cursor detecting means indicating the location of said cursor on said display means.

2. The data processing apparatus of claim 1, wherein each of said memory areas is identified by address data, and further comprising:
   address storing means for storing address data identifying the storage area in which a last displayed data item is stored;
   wherein said cursor means includes:
   cursor-address storing means for storing cursor-address data identifying the storage area designated by said designating means;
   said cursor detecting means includes:
   comparing means for comparing the cursor-address data stored in said cursor-address storing means with address data stored in said address storing means;
   and signal generating means for generating a first signal when the cursor-address data stored in said cursor-address storing means is a lower address than the address data stored in said address storing means, and for generating a second signal when the cursor-address data stored in said cursor-address storing means is not a lower address than the address data stored in said address storing means; and
   said deleting means includes:
   first means for deleting a data item stored in said storage area designated by said cursor means, responsive to said first signal generated by said signal generating means; and
   second means for deleting a data item stored in said storage are located just before said storage area designated by said cursor means when said delete-command is input from said delete-command input means, responsive to said second signal generated by said signal generating means.

3. The data processing apparatus of claim 2, wherein said first means includes shifting means for shifting a data item stored in said storage area designated by address data which has a higher address than the cursor-address data, after the data item stored in said storage area designated by said cursor means is deleted.

4. The data processing apparatus of claim 2, wherein said second means includes:
   subtracting means for decrementing a cursor-address data stored in said cursor-address storing means by one address increment so as to designate a display area just before the display area at which said cursor is displayed; and
   third means for deleting a data item stored in said storage area designated by the address data obtained by said subtracting means.

5. The data processing apparatus of claim 4, wherein said cursor means designates said storage area corresponding to the address data obtained by said subtracting means, after a data item stored in said storage area is deleted by said third means.

6. The data processing apparatus of claim 1, further comprising:
   insertion-mode designating means for designating an insertion-mode operation of the data processing apparatus;
   insertion-operation means for inserting a data item input from said input means into said storage area designated by said cursor means, when the insertion-mode is designated by said insertion-mode designating means; and
   insertion-mode detecting means for detecting whether or not the insertion mode is designated by said insertion-mode designating means; and
   wherein said deleting means deletes a data item stored in said storage area located just before said storage area designated by said cursor means when said insertion-mode detecting means detects that the insertion-mode is designated by said insertion-mode designating means, irrespective of the detection result obtained by said cursor detecting means.

* * * * *